United States Patent
Calle et al.

(10) Patent No.: US 9,233,394 B2
(45) Date of Patent: Jan. 12, 2016

(54) HYDROPHOBIC-CORE MICROCAPSULES AND THEIR FORMATION

(75) Inventors: Luz M. Calle, Merritt Island, FL (US); Wenyan Li, Orlando, FL (US); Jerry W. Buhrow, Viera, FL (US); Scott T. Jolley, Titusville, FL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 700 days.

(21) Appl. No.: 12/855,791

(22) Filed: Aug. 13, 2010

(65) Prior Publication Data

US 2010/0305234 A1 Dec. 2, 2010

Related U.S. Application Data

(63) Continuation-in-part of application No. 11/239,445, filed on Sep. 19, 2005, now Pat. No. 7,790,225.

(51) Int. Cl.
| | |
|---|---|
| *C23F 11/00* | (2006.01) |
| *B05D 5/00* | (2006.01) |
| *C09D 5/08* | (2006.01) |
| *C09D 5/29* | (2006.01) |
| *C09D 7/12* | (2006.01) |
| *B05D 5/06* | (2006.01) |
| *C08K 9/10* | (2006.01) |

(52) U.S. Cl.
CPC ......... *B05D 5/00* (2013.01); *C09D 5/082* (2013.01); *C09D 5/29* (2013.01); *C09D 7/1291* (2013.01); *B05D 5/06* (2013.01); *B05D 2202/00* (2013.01); *C08K 9/10* (2013.01); *Y10T 428/2984* (2015.01); *Y10T 428/2985* (2015.01); *Y10T 428/2987* (2015.01); *Y10T 428/2989* (2015.01); *Y10T 428/2991* (2015.01); *Y10T 428/2998* (2015.01)

(58) Field of Classification Search
None
See application file for complete search history.

(56) References Cited

U.S. PATENT DOCUMENTS

| | | | | | |
|---|---|---|---|---|---|
| 3,672,842 | A | * | 6/1972 | Florin | 436/164 |
| 4,273,671 | A | | 6/1981 | Allinikov | |
| 4,891,172 | A | * | 1/1990 | Matsushita et al. | 264/4.33 |
| 4,894,397 | A | * | 1/1990 | Morgan et al. | 523/201 |
| 4,956,129 | A | * | 9/1990 | Scher et al. | 264/4.7 |
| 5,317,987 | A | * | 6/1994 | Muller et al. | 116/206 |
| 5,411,888 | A | * | 5/1995 | Gordon et al. | 436/5 |

(Continued)

OTHER PUBLICATIONS

A. Kumar, et al., "Smart Coatings," 23rd Army Science Conference, Orlando, FL, Dec. 2002, www.asc2002.com/summaries/a/AP-16.pdf.

(Continued)

*Primary Examiner* — Mandy Louie
(74) *Attorney, Agent, or Firm* — Michelle L. Ford; Jennifer P. Yancy

(57) ABSTRACT

Hydrophobic-core microcapsules and methods of their formation are provided. A hydrophobic-core microcapsule may include a shell that encapsulates a hydrophobic substance with a core substance, such as dye, corrosion indicator, corrosion inhibitor, and/or healing agent, dissolved or dispersed therein. The hydrophobic-core microcapsules may be formed from an emulsion having hydrophobic-phase droplets, e.g., containing the core substance and shell-forming compound, dispersed in a hydrophilic phase. The shells of the microcapsules may be capable of being broken down in response to being contacted by an alkali, e.g., produced during corrosion, contacting the shell.

23 Claims, 2 Drawing Sheets

(56) References Cited

U.S. PATENT DOCUMENTS

| | | | |
|---|---|---|---|
| 5,596,051 A * | 1/1997 | Jahns et al. | 526/73 |
| 5,609,361 A * | 3/1997 | Bergerson et al. | 280/741 |
| 6,022,501 A * | 2/2000 | Dexter | A01N 25/28 264/4.7 |
| 6,075,072 A | 6/2000 | Guilbert et al. | |
| 6,080,334 A | 6/2000 | Heimann et al. | |
| 6,544,540 B2 | 4/2003 | Van Koppenhagen | |
| 6,716,526 B2 * | 4/2004 | Weston et al. | 428/402.2 |
| 6,933,046 B1 | 8/2005 | Cook | |
| 7,192,993 B1 * | 3/2007 | Sarangapani et al. | 523/200 |
| 2002/0081431 A1 | 6/2002 | Schmdt | |
| 2003/0068824 A1 | 4/2003 | Frankel et al. | |
| 2004/0026659 A1 * | 2/2004 | Lin | 252/183.11 |

OTHER PUBLICATIONS

M. Kendig, "Past, Present and Future 'Smart' Protective Coatings," Conference Advanced Research & Development of Coatings for Corrosion Protection: Offshore Oil & Gas Operations Facilities, Marine Pipeline & Ship Structures, Apr. 14-16, 2004, Biloxi, MS, Organized by Colorado School of Mines.

H. Yang, et al., "Plasma Deposition of Polymeric Thin Films on Organic Corrosion-Inhibiting Paint Pigments: A Novel Method to Achieve Slow Release," Plasmas and Polymers, 8(4): 297-323 Dec. 2003.

M. Kendig, et al., "Smart Corrosion Inhibiting Coatings," Progress in Organic Coatings 47, 183 (2003).

* cited by examiner

HYDROPHOBIC-CORE MICROCAPSULES AND THEIR FORMATION

CROSS REFERENCE TO RELATED APPLICATION

This application is related to co-pending application referenced as KSC-13167 entitled "Hydrophilic-Core Microcapsules and their Formation" filed concurrently, and is a continuation-in-part of U.S. patent application Ser. No. 11/239,445 entitled "Coatings and Methods for Corrosion Detection and/or Reduction," filed Sep. 19, 2005, the contents of which are commonly assigned and incorporated herein by reference.

STATEMENT OF GOVERNMENT INTEREST

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

FIELD OF THE INVENTION

The present invention relates generally to microcapsules, and in particular, the present invention relates to hydrophobic-core microcapsules and their formation.

BACKGROUND OF THE INVENTION

Metals and metal alloys are present in some shape or form in nearly every facet of our lives. Many metals and metal alloys are subject to corrosion that causes these metals and metal alloys to lose their structural integrity. As such, methods have been developed to detect the presence of corrosion and to inhibit corrosion.

For example, color or fluorescent indicators have been combined directly with liquid coating materials, such as paints, temporary coating materials, etc., to indicate corrosion, based on the pH or electrical changes associated with corrosion, when the coating materials are applied to corrosion containing surfaces. However, problems, such as the solubility of the indicator in a coating material and/or chemical reactions, interference with the coating material, etc., can arise when an indicator is combined directly with a coating material. Another problem is that the indicator may not be compatible with the coating material and may negatively affect the coating capability of the coating material when the indicator is combined directly with the coating material.

Nondestructive evaluation methods, such as X-ray techniques, including X-ray scattering and X-ray absorption spectroscopy, are sometimes used to detect the presence of corrosion under coatings. However, the resolution and/or sensitivity of such methods can make it difficult to detect corrosion in its early stages. In addition, these techniques can be excessively time intensive and typically require bulky, expensive equipment.

Corrosion inhibitors have also been combined directly with coating materials. However, directly combining a corrosion inhibitor with a coating material can lead to compatibility issues between the corrosion inhibitor and the coating material that can negatively affect the coating properties and/or reduce the corrosion protection capability of the corrosion inhibitor.

Microcapsules, containing a corrosion inhibitor, have been added to protective coatings, such as paints, that are applied to metal surfaces and dried. The microcapsules have a frangible wall material that confines the corrosion inhibitor until the dried coating is subjected to a mechanical force, due to an impact, abrasion, or cutting, etc., sufficient to fracture and fragment the wall material. When the fracture occurs, the corrosion inhibitor leaks into and spreads through damage sites to provide corrosion protection. However, there can be other defects in a coating applied to a surface besides those caused by mechanical forces, such as air bubbles occurring in the coating, pin holes occurring in the coating, uneven coating thickness, poor coating adhesion to an unclean metal substrate, poor coating adhesion at corners, etc., that can result in corrosion of the metal. In addition, the frangible capsules may include a dye that marks the damage sites for notice and possible detailed repair, but the dye is only released in response to the fracture of the capsules and indicates mechanical damage that could possibly, but not necessarily, result in corrosion.

SUMMARY OF THE INVENTION

Hydrophobic-core microcapsules and methods of their formation are provided. A hydrophobic-core microcapsule may include a shell that encapsulates a core substance which can be dissolved or dispersed in a hydrophobic material, such as dye, corrosion indicator, corrosion inhibitor, film forming compound, healing agent, or various combinations thereof. The hydrophobic-core microcapsules may be formed from an emulsion having hydrophobic-phase dispersed in a hydrophilic phase, with shell-forming compounds contained in the hydrophilic phase or the hydrophobic phase and the core substance contained in the hydrophobic phase. The shells of the hydrophobic-core microcapsules may be capable of being broken down in response to being contacted by an alkali, e.g., produced during corrosion, contacting the shell. The hydrophobic-core microcapsules may be dispersed in a coating formulation, such as paint.

DETAILED DESCRIPTION OF THE INVENTION

Figure 1:
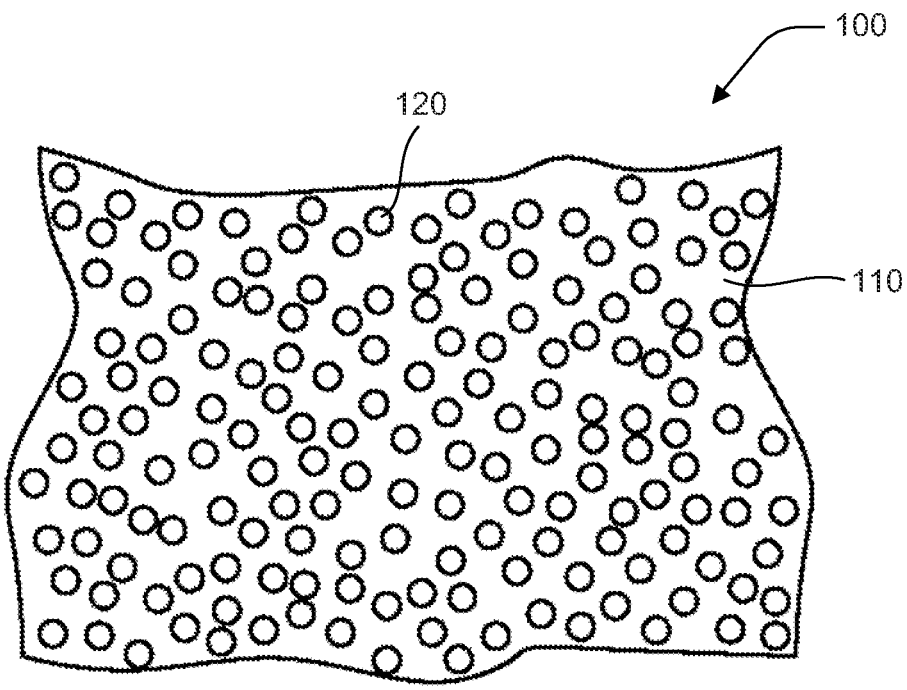
FIG. 1 illustrates a coating, according to an embodiment.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and chemical changes may be made without departing from the scope of the present invention. The following detailed description is, therefore, not to be taken in a limiting sense, and the scope of the present invention is defined only by the appended claims and equivalents thereof.

FIG. 1 illustrates a coating 100, according to an embodiment. Coating 100 includes a coating vehicle 110, such as clear or opaque paint, aqueous gel, water, etc., having microcapsules 120 dispersed within the coating vehicle 110, e.g., by mixing. For embodiments including the aqueous gel, coating 100 may be a temporary coating. For another embodiment, coating vehicle 110 may be a solvent, such as an aliphatic hydrocarbon, e.g., aliphatic petroleum distillates.

Figure 2:
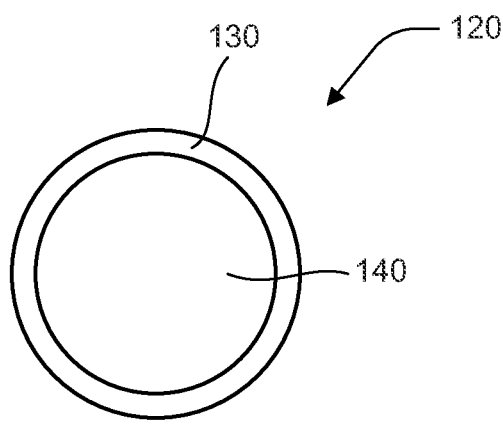
FIG. 2 illustrates a spherical microcapsule, according to another embodiment.

FIG. 2 is an enlarged view of a microcapsule 120, according to another embodiment. Microcapsule 120 includes a shell 130 that contains an encapsulant 140 (e.g., core material), such as one or more corrosion indicators, corrosion inhibitors, film-forming compounds, healing agents, or various combinations thereof. Encapsulant 140 may be a liquid, solid, or a gas entrapped in aerogel or various combinations thereof. For some embodiments, encapsulant 140 (e.g., which may be referred to as a core of the microcapsule) may include a hydrophobic substance, such as oil, or a hydrophilic substance, such as water, with one or more active substances such as corrosion indicator, corrosion inhibitor, film-forming compound, healing agent, or various combinations thereof dissolved or dispersed therein. For some embodiments, encapsulant 140 (e.g., which may be referred to as a core of the microcapsule) may contain only the active substances such as corrosion indicator, corrosion inhibitor, film-forming compound, healing agent, or various combinations thereof.

A suitable film-forming compound may be a clear varnish, such as an acrylic varnish. A suitable indicator may be a pH indicator that changes color over the alkaline region, e.g., pHs from about 8 to about 10, such as phenolphthalein. Another suitable indicator is one that fluoresces, such as 7-hydroxycoumarin, coumarin, Rhodamine B, etc., in the presence of or upon the oxidation of a metal or in the presence or upon the formation of a metal cation complex. A suitable corrosion inhibitor may be sodium nitrate, camphor, polyamine fatty acid salts in a solvent (such as toluene, vegetable oil, etc.), sodium molybdate, cerium nitrate, sodium phosphate, calcium metaborate, or the like. Suitable healing agents include epoxy resin and its hardeners, siloxane resin and its catalysts, any one part coating suspension in a solvent or two-part coating system that would cure at room temperature, or the like.

For some embodiments, microcapsules 120 may be substantially spherical as shown in FIG. 2.

Shell 130 is broken down or disintegrates in the presence of a base (such as an alkali), e.g., having a pH above about 8, for releasing encapsulant 140. That is, shell 130 is pH sensitive and breaks down by interacting with a compound, such as an alkali, having a particular pH. For example, shell 130 breaks down and releases its contents when an alkali produced during a corrosion reaction contacts shell 130.

A microcapsule 120 may be formed by forming an emulsion having droplets of a hydrophobic substance such as oil (e.g., toluene, vegetable oil, xylene, mineral oil), a mixture of hydrocarbons (e.g., diesel fuel), or any other non-water soluble organic material dispersed in a hydrophilic phase (e.g., an oil-in-water emulsion). Microcapsules, such as microcapsules 120, formed from emulsions with hydrophobic droplets (e.g., hydrophobic phase, such as an oil phase) dispersed in a substantially continuous hydrophilic phase may be termed hydrophobic- (e.g., oil-) core microcapsules.

A surfactant, such as xanthan gum (available from Fisher Scientific, Inc., Pittsburgh, Pa.), attapulfite clay (e.g., aluminum magnesium silicate, such as ATTAGEL® 40, a thickener available from Engelhard Corporation, Iselin, N.J.), alkylnaphthalene sulphonate powder (e.g., Petro BAF® powder from Akzo Nobel Chemicals, Inc., Chicago, Ill.), and/or midlevel sulfonation kraft lignin dispersants (e.g., REAX® 83A available from MeadWestvaco Corporation, Stamford, Conn.) is added to the emulsion to disperse the oil in the water. A pre-polymer, such as an amino resin pre-polymer, a cross-linking agent having one or more ester and mercapto groups that are broken down under basic conditions, and one or more core materials are added to the hydrophobic phase. A catalyst, such as an inorganic or organic acid, is added to the hydrophilic phase. The oil-in-water emulsion is heated, causing a polymerization reaction to occur at the water-oil interface, which forms shell 130 around encapsulant 140. Such a process is known as an interfacial polymerization process.

It is the interaction of alkaline conditions with the shell material that causes shell 130 to break down under alkaline conditions. Alternatively, encapsulant 140 can be released mechanically, such as by scratching or compressing a surface to which coating 100 is applied.

A basic condition, e.g., alkaline, often forms in the presence of corrosion in a metal or a metal alloy. A basic condition often forms next to corrosion-induced pits, crevices, etc. For example, as is known in the art, when a drop of salt water is applied to steel, the anodic reaction occurs to produce a rust spot, and the cathodic reaction (i.e., the reduction reaction of the oxygen in the presence of water) occurs to produce a basic condition. Therefore, when coating 100 is applied to a metal surface, and if corrosion occurs, shells 130 of the microcapsules 120 can be exposed to the basic condition (e.g., alkaline) and will break down under the basic condition resulting from the corrosion, thereby releasing encapsulant 140. Hereinafter, corrosion will refer to any chemical or electrochemical process involving the deterioration or degradation of metals, including pitting, crevice corrosion, dissimilar metal corrosion, or the like.

For one embodiment, coating 100 is temporarily applied to a metal surface, by spraying or brushing, to detect whether corrosion has occurred. Examples of a metal surface include a bare metal surface; a metal surface coated with paint, varnish, epoxy, etc.; a metal coated with a previous application of coating 100; or the like. For example, a coating containing the microcapsules disclosed herein may be applied as a primer coating, a top coating, or an intermediate coating between a primer coating and a top coating. Other examples of a metal surface include metal or metal alloy, e.g., a ferrous metal or alloy. For this embodiment, coating vehicle 110 is an aqueous gel and encapsulant 140 includes a suitable indicator, such as the pH indicator or florescent indicator as described above. In the presence of corrosion, the shells 130 of the microcapsules 120 break down, releasing the indicator. The pH indicator will change color or the florescent indicator will fluoresce to indicate the presence of corrosion. Another example of a temporary coating is a water suspension of microcapsules 120.

Coating vehicle 110 is not limited to an aqueous gel, or other temporary coatings, but can be a clear paint or varnish, opaque paint or varnish, etc., that is substantially permanently applied to the metal surface by spraying, brushing, or rolling, for example. For another embodiment, coating 100 is applied substantially permanently to a bare metal surface as a primer coat that may be clear coated.

For some embodiments, where coating 100 is substantially permanently applied, encapsulant 140 may include the indicator or the corrosion inhibitor or both. For other embodiments, encapsulant 140 may include the indicator, the healing agent, or the corrosion inhibitor, or various combinations thereof. If corrosion occurs, encapsulant 140, due to shells 130 breaking down in the presence of the basic condition resulting from the corrosion, is released, and the corrosion inhibitor acts to prevent further corrosion, while the indicator indicates the corrosion location. For another embodiment, a trauma, such as a scratch, an impact, etc., to coating 100 may act to expose metal. The trauma can also break shells 130 so as to release corrosion inhibitor that acts to reduce the degree of the corrosion of the exposed metal.

For another embodiment, where coating 100 is substantially permanently applied, encapsulant 140 may include the film-forming compound; the film-forming compound and corrosion inhibitor; the film-forming compound, corrosion inhibitor, and indicator; the film-forming compound and healing agent; the film-forming compound, indicator, and healing agent; or the film-forming compound and the indicator. For example, encapsulant 140 may include the film-forming compound, corrosion inhibitor, indicator, healing agent, or various combinations thereof. For one embodiment, if coating 100 is exposed to trauma that causes shells 130 to break, the film-forming compound covers at least a portion of the trauma and acts to reduce the degree of any exposed metal of corroding. For some embodiments, the corrosion inhibitor acts to further reduce the degree of corrosion of any exposed metal.

Note that if corrosion occurs at locations away from the trauma location due to small breaks in the coating, such as chips or other coating defects, corrosion inhibitor and film-forming compound will be released due to shells 130 breaking down in the presence of the basic condition, resulting from the corrosion. In other embodiments, the indicator will indicate the presence of the corrosion.

For some embodiments, the different functions of the core components can be incorporated into a coating by encapsulating different core components into the same capsules, or by incorporating different capsules with different components within the coating. For example, a portion of microcapsules 120 in coating 100 may contain corrosion inhibitor and/or the healing agent and another portion of microcapsules 120 in coating 100 may contain indicator. In another example, a portion of microcapsules 120 in coating 100 may contain corrosion inhibitor and/or the healing agent, another portion of microcapsules 120 in coating 100 may contain indicator, and yet another portion of microcapsules 120 in coating 100 may contain film-forming compound. In another example, a portion of microcapsules 120 in coating 100 may contain film-forming compound and another portion of microcapsules 120 in coating 100 may contain indicator. For some embodiments, microcapsules 120 having different contents are randomly distributed within coating vehicle 110 so that microcapsules 120 having the different functions of indicating, inhibiting, healing, and/or film-forming may be adjacent each other, as well as microcapsules 120 having like functions being adjacent each other.

As indicated above, hydrophobic-core microcapsules, such as oil-core microcapsules, may be formed from emulsions (e.g., oil-in-water emulsions). These emulsions include hydrophobic-phase droplets, such as oil-phase droplets, (e.g., as the dispersed phase) dispersed in a hydrophilic phase, such as a water phase, (e.g., as the continuous phase). If a compound (active substance) is hydrophobic, or it can be dissolved or dispersed in hydrophobic substance, (e.g. an oil), then it is possible to encapsulate it in hydrophobic-core microcapsules. When a compound does not have sufficient solubility in the hydrophobic phase, a co-solvent may be used to improve the dissolution of the active compound and facilitate the encapsulation process. Similarly, when a compound cannot be dispersed into oil to form a reasonably stable suspension (e.g., indicated by droplets of the compound being dispersed throughout the oil and the compound remaining dispersed during emulsion formation and encapsulation processes), a surfactant may be used to improve the dispersion of the compound and facilitate the encapsulation process. So if a compound is an oil, or it can be dissolved or dispersed in oil, with or without the aid of a co-solvent or a surfactant, it is possible to encapsulate it into oil-core microcapsules.

Hydrophobic-core microcapsules are typically used for encapsulating oil-soluble materials, but not water-soluble materials, such as salts or polar molecules. Water-soluble materials can be incorporated into oil-core microcapsules by first adding them to a co-solvent, such as a polar co-solvent, and then adding the resulting solution to the hydrophobic phase. Alternatively, a surfactant can be added to the hydrophobic phase. This will dissolve or disperse the polar or water-soluble reagents into the hydrophobic phase. The emulsion (e.g. oil-in-water emulsion) can then be formed by adding the hydrophobic phase (e.g. oil phase) to a hydrophilic phase (e.g. water phase) and a reaction can be initiated in the oil-in-water emulsion to encapsulate oil, with the active substance dissolved or dispersed therein, into the core of the hydrophobic-core microcapsules.

In general, oil-core and water-core microcapsules include an encapsulant contained within a shell (shell 130), such as a polymeric shell (FIG. 2). For example, the core (encapsulant 140) of an oil-core microcapsule may include a hydrophobic substance, such as oil, an active substance dissolved in the oil, with or without the aid of a co-solvent, or an active substance dispersed in the oil, with or without the aid of a surfactant. The active substance dissolved or dispersed in the encapsulated oil may include a dye, a corrosion indicator, a corrosion inhibitor, a film-forming compound, a healing agent, or various combinations thereof. The encapsulant, 140, of a water-core microcapsule, may include water, an active substance dissolved in the water, with or without the aid of a co-solvent, or an active substance dispersed in the water, with or without the aid of a surfactant. The active substance dissolved or dispersed in the encapsulated water may include a dye, a corrosion indicator, a corrosion inhibitor, a film-forming compound, a healing agent, or various combinations thereof.

The polymeric shell of oil-core microcapsules may include a polymer formed from a shell-forming compound (e.g., shell-forming precursor) that comprises, consists of, or consists essentially of a cross-linking agent having one or more ester and mercapto groups and/or a film-forming pre-polymer. The shell-forming compound may comprise, consist of, or consist essentially of about 5 to about 75 percent (e.g., about 20 to about 50 percent) by mass of a cross-linking agent and about 25 to about 95 percent (e.g., about 50 to about 80 percent) by mass of a film-forming pre-polymer. Examples of the cross-linking agent include, but are not limited to, pentaerythritol tetrakis(2-mercaptoacetate) or compounds with similar structure (e.g., pentaerythritol tetrakis(3-mercaptopropionate) (PTT)), pentaerythritol, dipentaerythritol, dipentaerythritol pentaacrylate tetra(mercaptoacetate), pentaerythritol tetra(acrylate), and their derivatives. Examples of the film-forming pre-polymer include, but are not limited to, urea formaldehyde pre-polymer resin (e.g., butylated urea-formaldehyde resin, such as CYMEL® U80), melamine formaldehyde resin, polyurethane prepolymers, polyols, or film forming monomers, such as urea and formaldehyde solution, melamine and formaldehyde solution, isocyanates and various glycols, etc. Note that the shell-forming compound forms the shells of the oil-core and water-core microcapsules.

The microcapsule shell of oil-core microcapsules may include one or more chemical bonds due to the ester group in the cross-linking agent that are cleavable (e.g., broken down) at ambient temperature when the surrounding pH changes due to the occurrence of a corrosion process. For example, the ester groups may undergo an irreversible hydrolysis reaction under basic pH, e.g., when exposed to an alkali.

Pentaerythritol tetrakis(2-mercaptoacetate)-type molecules are normally not a good film former by themselves. As such, the film-forming pre-polymers, such as urea formaldehyde or melamine formaldehyde pre-polymers serve as the precursor that provides the structure integrity of the capsule shell.

Cross-linking agents that have three or four functional groups, such as pentaerythritol tetrakis(2-mercaptoacetate), pentaerythritol tetrakis(3-mercaptopropionate) (PTT), pentaerythritol, dipentaerythritol, dipentaerythritol pentaacrylate tetra(mercaptoacetate), and pentaerythritol tetraacrylate can also provide chemical resistance (e.g. solvent resistance) to the microcapsule shells.

Figure 3:
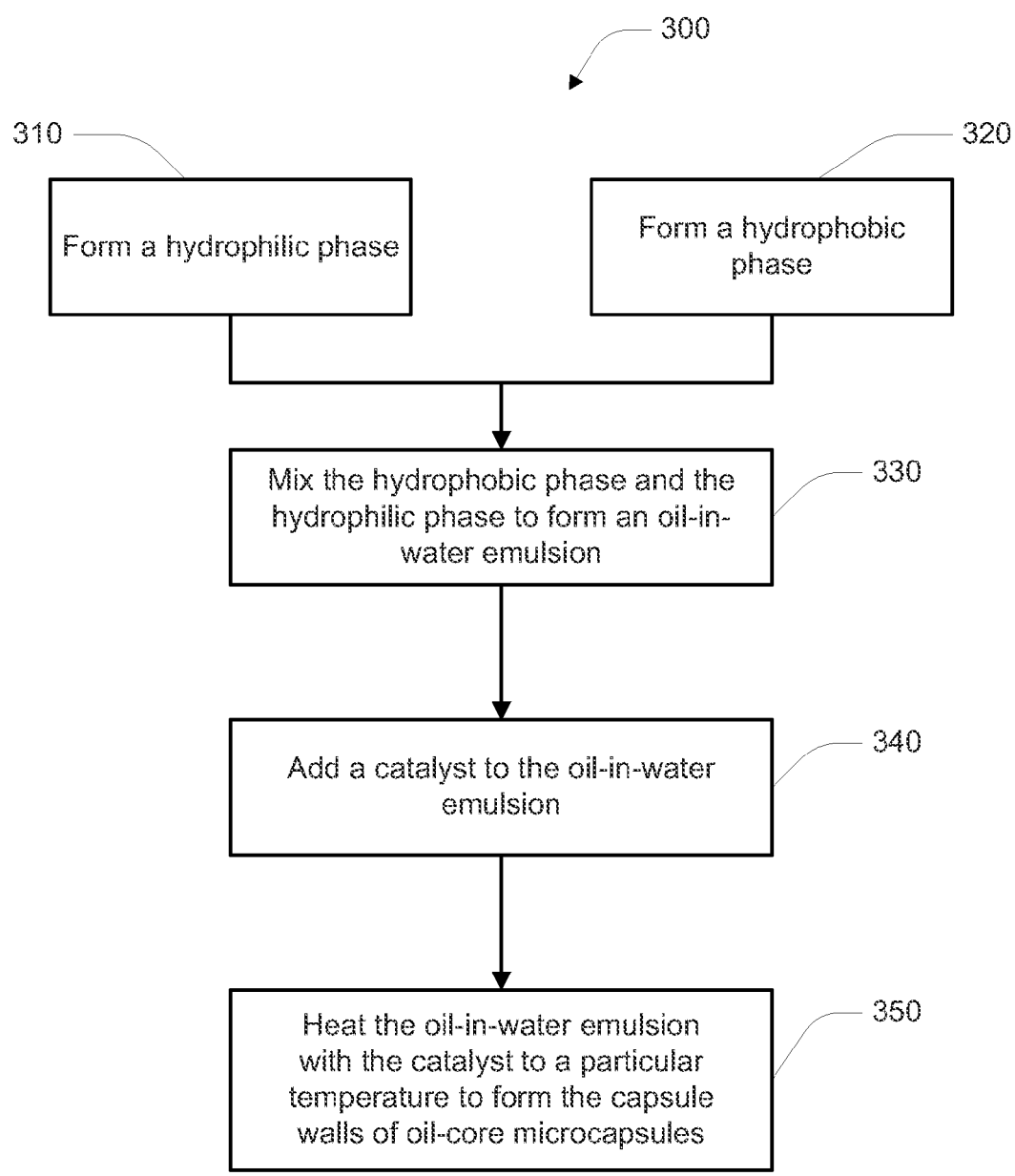
FIG. 3 presents a flowchart of a method for forming hydrophobic-core microcapsules, according to another embodiment.

FIG. 3 is flowchart of an example process 300 for forming hydrophobic- (e.g., oil-) core microcapsules. At block 310, a hydrophilic phase (e.g., a water phase) is formed by dissolving or dispersing surfactants (such as High HLB (hydrophile-lipophile balance surfactants, e.g., with a HLB value of about 8 to about 18), thickener, and particle or polymer emulsion stabilizer in water. For example, one or more surfactants, such as xanthan gum, Petro BAF powder, ATTAGEL® 40, REAX 83A®, or ZeMac E400® may be dissolved or dispersed in water one at a time while stirring. Another example of a surfactant is a mixture of branched polyoxyethylene(5) nonylphenyl ether (IGEPAL® CO-520) and polyvinyl alcohol (PVA).

In general, the hydrophilic phase may include about 0.05 to about 30 percent, by mass, surfactant and about 70 to about 99.5 percent, by mass, water. For example, the hydrophilic phase may include about 1 percent, by mass, of the surfactant having branched polyoxyethylene(5) nonylphenyl ether, (IGEPAL® CO-520) and polyvinyl alcohol (PVA) and about 99 percent, by mass, water. Alternatively, the hydrophilic phase may include about 5 to about 6 percent, by mass, of a surfactant, including a mixture of xanthan gum, Petro BAF, ATTAGEL® 40, and REAX 83A®, and about 94 to about 95 percent, by mass, water.

At block 320 a hydrophobic phase (e.g., an oil phase) is formed. For example, a monomer and pre-polymer may be added to oil to form the hydrophobic phase. For example, shell-forming compounds comprising, consisting of, or consisting essentially of a cross-linking agent and a pre-polymer may be added to the hydrophobic phase. For example, the shell-forming compounds form the shells of the completed microcapsules. The active substances such as dye, corrosion indicator, corrosion inhibitor, film-forming compound, healing agent, or various combinations thereof may be also added to the hydrophobic phase. For some embodiments, the hydrophobic phase may include two hydrophobic phases that are formed individually to avoid the possible incompatibility between different ingredients.

The hydrophobic phase may comprise, consist of, or consist essentially of a solvent, the shell-forming compound, dye, corrosion indicator, corrosion inhibitor, film-forming compound, healing agent, or various combinations thereof. Non-limiting examples of the hydrophobic material include aromatic hydrocarbons (such as toluene, xylene), mineral oil, vegetable oil, a mixture of hydrocarbons (such as diesel fuel), or any other nonpolar organic material. The pre-polymer or the cross-linking agent of the shell-forming compound should have chemical bonds that are susceptible to a hydrolysis reaction under basic conditions, e.g., the cross-linking agent should provide an ester group. This causes the shell to break down when exposed to an alkali. For example, when a butylated urea-formaldehyde resin (CYMEL® U80) is used as the pre-polymer, a suitable shell-forming precursor that provides an ester group may be the cross-linking agent penta erythritol tetrakis(3-mercaptopropionate) (PTT). For some embodiments, a co-solvent, such as ethanol or isopropanol may be added to the hydrophobic phase.

For some embodiments, the hydrophobic phase may include about 5 to about 20 percent, by mass, pre-polymer, about 2 to about 20 percent, by mass, cross-linker, about zero to about 10 percent, by mass, corrosion indicator or corrosion inhibitor, about zero to about 30 percent, by mass, co-solvent, and about 20 to about 93 percent solvent.

For embodiments, where two hydrophobic phases are formed individually, a first hydrophobic phase (hydrophobic phase I) may include an oil-soluble surfactant, such as sodium bis(2-ethylhexyl)sulfosuccinate (AEROSOL® OT) and a dye, such as water-soluble dye, e.g., Rhodamine B (a fluorescent dye), and/or a healing agent, such as chlorobenzene. The second hydrophobic phase (hydrophobic phase II) may include pre-polymer, such as CYMEL® U80, and a cross-linking agent, such as penta erythritol tetrakis(3-mercaptopropionate) (PTT). For embodiments, where the first hydrophobic phase includes healing agent, the healing agent may be used as the solvent.

The hydrophobic phase is then added to the hydrophilic phase to form an oil-in-water emulsion at block 330. For example, the hydrophobic phase may be mixed into the hydrophilic phase so that hydrophobic phase droplets are dispersed within the hydrophilic phase. For example, the oil-in-water emulsion may be about 20 to about 60, percent, by mass, hydrophobic phase and about 40 to about 80 percent, by mass, hydrophilic phase. For embodiments, involving two hydrophobic phases, the hydrophobic phase containing the surfactant (hydrophobic phase I) is usually added to the hydrophilic phase before adding hydrophobic phase II containing the pre-polymer and cross-linking agent. The resulting oil-in-water emulsion includes oil droplets that include hydrophobic phase I and hydrophobic phase II and that are dispersed in the hydrophilic phase. For example, the oil-in-water emulsion may be about 1 to about 15 percent, by mass, hydrophobic phase I, about 10 to about 20 percent, by mass, hydrophobic phase II, and about 65 to about 89 percent, by mass, hydrophilic phase. At block 340, a catalyst is added to the oil-in-water emulsion. Acids, both inorganic and organic, can be used as catalysts. For example, an acid may be added to the oil-in-water emulsion until its pH is in the range of about 2 to about 5.

At block 350, the oil-in-water emulsion, including the catalyst, is heated to a particular temperature, causing an interfacial polymerization reaction. For example, heating the emulsion to a temperature that lies in the temperature range of about 50 to about 70° C. may result in a reaction time of less than about 3 hours for solid microcapsule shell (e.g., wall) formation.

The capsule size can be controlled by the emulsion formula, but the mixing speed of the mixer (e.g., a homogenizer) during the emulsion formation at block 330 also acts to control the capsule size. By adjusting both the emulsion formula and the mixing speed, microcapsules with a relatively narrow size distribution can be formed. For example, sizes from about 100 nanometers to about 500 microns can be formed with a typical size from about 1 to about 5 microns. For other embodiments, the microcapsules have a size in the range from about 1 to about 50 microns.

The shell forming precursor, such as the cross-linking agent pentaerythritol tetrakis(2-mercaptoacetate) or penta erythritol tetrakis(3-mercaptopropionate) (PTT), and urea formaldehyde or melamine formaldehyde prepolymer or their monomers, results in a desirable combination of the pH sensitivity and the structural integrity of the shell. Heating time can also affect the pH sensitivity and the structural integrity of the shell. Shorter heating times result in thinner capsule walls, meaning high pH sensitivity. Increasing the amount of cross-linking agent can also increase the pH sensitivity of the microcapsule.

After heating for a particular time, and before terminating the reaction, a sample of the mixture may be tested, e.g., by centrifuging, to determine whether any of the hydrophobic phase still remains, which indicates that not all of the hydrophobic phase is encapsulated, and thus a longer heating time may be required. If there is substantially no remaining hydrophobic phase in a centrifuged sample, then the solid microcapsule walls are formed. After the solid wall forms, the reaction is allowed to continue to allow sufficient time for the microcapsule wall to cure, and then the reaction can be terminated, e.g., by neutralizing the reaction mixture to a pH of about 7, such as by adding an ammonia water solution. Another way to determine if the solid microcapsule walls are formed is to take an emulsion sample and allow the water within to evaporate. Then observe the remaining sample. If liquid oil remains, the microcapsule wall is not yet completely formed. If only solid particles are observed, then the solid microcapsules walls are already formed.

Examples 1-8

Preparation of Hydrophobic-Core, e.g. Oil-Core Microcapsules

Hydrophobic-core (oil-core) microcapsules were prepared using the following example processes formulas:

TABLE 1

Example 1A - Empty oil-core microcapsule formula.

|  | Weight (gram) |
|---|---|
| Oil Phase |  |
| U-80 | 16 |
| PTT | 12 |
| Toluene | 121 |
| Isopropanol | 50 |
| Water Phase |  |
| Water | 400 |
| Gum | 0.48 |
| BAF | 0.96 |
| Attagel 40 | 9.6 |
| Reax 83A | 12.8 |

In Example 1A, the water phase was prepared by respectively dissolving water-soluble surfactants, such as xanthan gum, Petro BAF powder, ATTAGEL® 40, and REAX 83A®, in water, one at a time, while stirring, as shown in Table 1. The oil phase in Example 1A was prepared by adding a pre-polymer, such as CYMEL® U80, and a cross-linking agent, such as penta erythritol tetrakis(3-mercaptopropionate) (PTT) to the oil, such as toluene, and stirred, e.g., using a Powergen 500 homogenizer (available from Fisher Scientific, Inc.), until mixed. A co-solvent, such as isopropanol, was added to the oil phase in Example 1A to assist emulsion formation. The oil phase was dispersed into the water phase by stirring, e.g., at a Powergen 500 homogenizer stirrer speed of about 10000 rpm, to form an oil-in-water emulsion.

When the sizes of the oil-phase droplets are substantially uniform within the emulsion, the polymer shell of the microcapsules is formed through a polymerization reaction initiated by adding the catalyst, e.g., an acid catalyst, such as an inorganic and/or organic acid, and heating the emulsion. For example, sulfuric acid (4N $H_2SO_4$) may be added, e.g., a drop at a time, to the emulsion, while stirring, until the pH is about 2 or 3. The emulsion is then heated, e.g., to about 70° C., to initiate a polymerization reaction, and is maintained at about 70° C. for a reaction time of about 2 hours to form oil-core microcapsules having an average diameter of less than about 5 microns.

Oil-core microcapsules containing a core substance including the corrosion indicator, phenolphthalein, were formed in Example 1B. The oil phase in Example 1B was prepared as described above in Example 1A, except that phenolphthalein is dissolved in isopropanol and the resulting solution were added to the oil phase, as shown in the Table 2 below:

TABLE 2

Example 1B formula for oil-core microcapsule with pH indicator

|  | Weight (gram) |
|---|---|
| Oil Phase |  |
| U-80 | 16 |
| PTT | 12 |
| Toluene | 121 |
| Phenolphthalein | 2 |
| Iso-Propanol | 50 |
| Water Phase |  |
| Water | 400 |
| Gum | 0.48 |
| BAF | 0.96 |
| Attagel | 9.6 |
| Reax 83A | 12.8 |

The resulting microcapsules had a size below about 2 microns, with shells encapsulating a core of toluene and isopropanol with phenolphthalein dissolved therein.

Oil-core microcapsules containing a core substance including the corrosion inhibitor, $CeCl_3$ (cerium(III) chloride), were formed using the water phase of Example 1A. The oil phase was prepared as described above in Example 1A, except that $CeCl_3$ (e.g., $CeCl_3$ $7H_2O$) was dissolved in a co-solvent, such as ethanol, and the resulting solution was added to the oil phase, as shown in Table 3 below:

TABLE 3

Example 1C formula for oil-core microcapsule with $CeCl_3$

|  | Weight (gram) |
|---|---|
| Oil Phase |  |
| U-80 | 16 |
| PTT | 12 |
| Toluene | 121 |
| $CeCl_3$•$7H_2O$ | 2 |
| Ethanol | 50 |
| Water Phase |  |
| Water | 400 |
| Gum | 0.48 |
| BAF | 0.96 |
| Attagel 40 | 9.6 |
| Reax 83A | 12.8 |

Example 2 uses a different process from the process of Example 1A-1C, as shown in Table 4 below. In Example 2, a corrosion indicator was dispersed into oil phase directly. The oil phase was dispersed into the water phase by stirring, using a conventional high shear stirrer at a stirring speed of about 800 to about 1200 rpm, to form the oil-in-water emulsion. 4N $H_2SO_4$ was added, a drop at a time, to the emulsion while stirring, until the pH was about 3. The emulsion was then heated to about 50° C. to initiate an interfacial polymerization reaction. The emulsion was maintained at about 50° C. for a reaction time of about 3 hours to form oil-core microcapsules having an average size of less than about 50 microns, with shells encapsulating a core of toluene and phenolphthalein dissolved therein.

TABLE 4

Example 2 formula for oil-core microcapsule with pH indicator.

|  | Weight (gram) |
|---|---|
| Oil Phase | |
| Cymel U-80 | 3.85 |
| PTT | 0.95 |
| Toluene | 27.2 |
| Phenolphthalein | 0.5 |
| Water Phase | |
| Water | 21.6 |
| Xanthan Gum | 0.028 |
| Petro BAF Powder | 0.06 |
| Attagel 40 | 0.6 |
| Reax 83A | 0.83 |

Example 3 uses a water phase somewhat different with that of Example 2, as shown in Table 5 below. The corrosion indicator, phenolphthalein, was first dissolved in isopropanol, and then the resulting solution was added into the oil phase. The mixing speed, the acid catalyst, and the heating method were kept the same as Example 2. The resulting oil-core microcapsules had an average size of about 25-30 microns, with shells encapsulating a core of toluene and isopropanol with phenolphthalein dissolved therein.

TABLE 5

Example 3 formula for oil-core microcapsule with pH indicator.

|  | Weight (gram) |
|---|---|
| Oil Phase | |
| Cymel U-80 | 1.9 |
| PTT | 0.48 |
| Toluene | 13.6 |
| Phenolphthalein | 0.25 |
| Isopropanol | 6.3 |
| Water Phase | |
| Water | 21.6 |
| Xanthan Gum | 0.028 |
| Petro BAF Powder | 0.06 |
| Attagel 40 | 0.3 |
| Reax 83A | 0.83 |

Microcapsules containing other corrosion indicators, such as phenol red and fluorescein, were formed using methods similar to examples 1A-1C, 2, and 3, using formulas shown in Tables 6 and 7 below. The preparation of the oil phase included dissolving phenol red or fluorescein in a co-solvent, such as isopropanol, and then adding the resulting solution to an oil phase.

TABLE 6

Formula for oil-core microcapsule with phenol Red.

|  | Weight (gram) |
|---|---|
| Oil Phase | |
| U-80 | 8 |
| PTT | 6 |
| Toluene | 60.2 |
| Phenol Red | 1 |
| Iso-Propanol | 25.2 |
| Water Phase | |
| Water | 200 |
| Gum | 0.24 |
| BAF | 0.48 |
| Attagel | 4.8 |
| Reax 83A | 6.4 |

TABLE 7

Formula for oil-core microcapsule with Fluorescein.

|  | Weight (gram) |
|---|---|
| Oil Phase | |
| U-80 | 8 |
| PTT | 6 |
| Toluene | 60.2 |
| Fluorescein | 0.5 |
| Iso-propanol | 25.2 |
| Water Phase | |
| Water | 200 |
| Gum | 0.24 |
| BAF | 0.48 |
| Attagel | 4.8 |
| Reax 83A | 6.4 |

Oil-core microcapsules with dye may be prepared, according to Example 4, e.g., in order to observe the dispersing property of the microcapsules in a paint formulation or a coating formulation. For example, the dye, e.g., Rhodamine B, may be water soluble, and thus it dissolves in the water phase, regardless of whether a co-solvent, such as alcohol, is used. The idea here is to use an oil-soluble surfactant, such as AEROSOL® OT, that can interact with Rhodamine B, so the Rhodamine B can be dispersed in the oil phase.

In Example 4, a water phase was formed as described above in conjunction with Example 1, as shown in the Table 8 below. An oil phase I was formed by dissolving Rhodamine B dye in AEROSOL® OT and adding the resulting solution to oil, such as toluene. An oil phase II was formed by adding CYMEL® U80 and PTT to toluene and stirring. Oil phase I was added to the water phase first to form an oil-in-water emulsion. Oil phase II was then added to the oil-in-water emulsion, a drop at a time, while stirring. A polymerization reaction was then initiated by adding a catalyst, e.g., an acid catalyst, and heating the oil-in-water emulsion. For example, the resulting microcapsules had a core, including toluene, AEROSOL® OT, and Rhodamine B, and had a size below about 5 microns.

TABLE 8

Example 4 formula for oil-core microcapsule with dye.

| | Weight (gram) |
|---|---|
| Water Phase | |
| Water | 250 |
| Gum | 0.24 |
| BAF | 0.5 |
| Attagel | 5 |
| Reax 83A | 6.4 |
| Oil Phase (I) | |
| Toluene | 34.7 |
| AOT | 1.0 |
| Dye (Rhodamine B) | 0.96 |
| Oil Phase (II) | |
| Toluene | 34.7 |
| U-80 | 8 |
| PTT | 6 |

As indicated above, a healing agent may be encapsulated in a microcapsule. Self healing is an important function of a coating containing the microcapsules disclosed herein. For example, a solvent, e.g., an oil, such as chlorobenzene, may be used as a healing agent.

In Example 5, chlorobenzene-containing oil-core microcapsules were formed using the formula in Table 9. A water phase was formed by adding, one at a time in order, xanthan gum, Petro BAF powder, ATTAGEL® 40, and REAX 83A® to water and dissolving by mixing, e.g., at about 4000 rpm using the Powergen homogenizer. An oil phase I was formed by dissolving AEROSOL® OT and dye, such as Rhodamine B dye, in chlorobenzene. The oil phase I was then added into the water phase under agitation and mixed until a stable oil-in-water emulsion was formed (e.g., indicated by droplets of oil phase I being substantially uniformly dispersed throughout the water phase). An oil phase II was formed by dissolving CYMEL® U80 and pentaerythritol tetrakis(3-mercaptoacetate) (PTT) in chlorobenzene. Oil phase II was then added to the oil-in-water emulsion, and the oil-in-water emulsion was mixed until oil-in-water emulsion was stable (e.g., indicated by oil-phase droplets, including a solution of oil phase I and oil phase II, being substantially uniformly dispersed throughout the water phase).

When the oil-in-water emulsion is stable, the pH of the oil-in-water emulsion may be adjusted, e.g., to a pH of about 2, using a 4N $H_2SO_4$ solution. The temperature of the oil-in-water emulsion is then raised, e.g., to about 70° C., to initiate a polymerization reaction. The temperature is maintained at about 70° C. for a reaction time of about 3 hours. After about 3 hours, the reacted emulsion was cooled to about room temperature, and the microcapsules, e.g., having a size of about 3 to about 5 microns, were separated. Note that the size of the microcapsules thus formed is suitable for coating applications. The microcapsules have shells encapsulating a core of AEROSOL® OT and Rhodamine B dye dissolved in chlorobenzene.

TABLE 9

Example 5 formula for oil-core microcapsule containing chlorobenzene and a dye.

| | Weight (gram) |
|---|---|
| Water Phase | |
| Gum | 0.12 |
| BAF | 0.25 |

TABLE 9-continued

Example 5 formula for oil-core microcapsule containing chlorobenzene and a dye.

| | Weight (gram) |
|---|---|
| Attagel | 1.25 |
| Reax83 | 3.2 |
| Water | 175 |
| Oil I | |
| AOT | 0.5 |
| dye | 2 |
| chlorobenzene | 5 |
| Oil II | |
| U80 | 4 |
| PTT | 3 |
| chlorobenzene | 20 |

In some embodiments, the surfactants xanthan gum, Petro BAF powder, ATTAGEL® 40, and REAX 83A® may be replaced by the surfactants IGEPAL® CO-520 and polyvinyl alcohol (PVA) in the water phase. For example, in Examples 6 and 7, oil-core microcapsules were formed using the formulas shown in Table 10 and 11.

After the water phase and the oil phase were formed and mixed together to form a stable oil in water emulsion, a catalyst (para-toluene sulfonic acid (PSTA)) was then added to the emulsion. After adding the catalyst, the emulsion was heated to about 70° C. to initiate a polymerization reaction, and was maintained at about 70° C. for a reaction time of about 3 hours. These oil-core microcapsules were then separated from the water phase by centrifuging at about 5000 rpm. These oil-core microcapsules had a core of toluene and ethanol encapsulated within the shells.

Using IGEPAL® CO-520 and polyvinyl alcohol (PVA) in the water phase in place of xanthan gum, Petro BAF powder, ATTAGEL® 40, and REAX 83A® resulted in a less stable emulsion that enabled the microcapsules to be more easily separated from the suspension after the reaction.

TABLE 10

Example 6 formula for empty oil-core microcapsule.

| | Weight (gram) |
|---|---|
| Oil Phase | |
| U-80 | 4 |
| PTT | 1 |
| toluene | 17.3 |
| ethanol | 3.2 |
| Water Phase | |
| Water | 75 |
| PVA (4%) | 25 |
| Igepal CO-520 | 0.1 |
| Catalyst (PSTA) | 0.5 |
| heating | 70° C. for 3 |

TABLE 11

Example 7 formula for oil-core microcapsule with indicator.

| | Weight (gram) |
|---|---|
| Oil Phase | |
| U-80 | 16 |
| PTT | 8 |
| toluene | 69.4 |

TABLE 11-continued

Example 7 formula for oil-core microcapsule with indicator.

| | Weight (gram) |
|---|---|
| ethanol | 15.8 |
| phenolphthalein | 0.5 |
| Water Phase | |
| Water | 300 |
| PVA (4%) | 100 |
| Igepal CO-520 | 0.4 |
| Catalyst (PSTA) | 2 |
| heating | 70° C. for 3 hours |

Oil-core microcapsules containing a pH indicator, such as phenolphthalein, may be formed using the water-phase surfactants of Example 6, as shown in Table 12 for Example 8, wherein an oil phase was added to a water phase while mixing to form a stable emulsion. The catalyst PSTA is added to the emulsion. The emulsion was then heated to about 70° C. to initiate a polymerization reaction, and was maintained at about 70° C. for a reaction time of about 3 hours. The microcapsules were then separated from the water phase by centrifuging at about 5000 rpm. The microcapsules had shells encapsulating a core of phenolphthalein dissolved in toluene and ethanol.

Oil-core microcapsules containing water-soluble dye, such as Rhodamine B, may be formed using the water-phase surfactants of Example 6, as shown in Table 12 below. For example, in Example 8, an oil phase and a water phase were formed. The oil phase was added to the water phase while mixing to form a stable emulsion. PSTA was added to the emulsion as a catalyst. After adding the PSTA, the emulsion was heated to about 70° C. to initiate an interfacial polymerization reaction, and was maintained at about 70° C. for a reaction time of about 3 hours. The microcapsules were then separated from the water phase by centrifuging at about 5000 rpm. The microcapsules had shells encapsulating a core of Rhodamine B, toluene, and ethanol.

TABLE 12

Example 8 formula for oil-core microcapsule with dye.

| | Weight (gram) |
|---|---|
| Oil Phase | |
| U-80 | 4 |
| PTT | 2 |
| toluene | 17.3 |
| ethanol | 3.9 |
| Rhodamine B | 0.5 |
| Water Phase | |
| Water | 75 |
| PVA (4%) | 25 |
| Igepal CO-520 | 0.1 |
| Catalyst (PSTA) | 0.5 |
| heating | 70° C. for 3 hours |

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

We claim:

1. A method of forming hydrophobic-core microcapsules comprising:
    forming a hydrophobic phase including a pre-polymer or monomer, a cross-linking agent, at least one active substance, wherein said at least one active substance is a corrosion indicator, a corrosion inhibitor, or combination thereof, an optional co-solvent, and a hydrophobic substance;
    forming a hydrophilic phase;
    mixing the hydrophobic phase with the hydrophilic phase to create and disperse droplets of the hydrophobic phase within the hydrophilic phase to form an emulsion;
    initiating a reaction at an interface of the hydrophilic phase and the hydrophobic phase to form a solid shell encapsulating the hydrophobic phase forming hydrophobic-core microcapsules, wherein said solid shell includes a shell wall comprising a compound having one or more chemical bonds that are broken down when contacted with an alkali produced during a corrosion reaction causing the release of the hydrophobic phase, wherein said alkali has a pH above about 8.

2. The method of claim 1, wherein said cross-linking agent comprises one or more ester groups.

3. The method of claim 2, wherein the cross-linking agent is selected from fully esterified monomers comprising ethyleneglycol di-2-mercapto acetate, ethyleneglycol di-2-hydroxyacetate, pentaerythritol tetrakis(2-hydroxyacetate), pentaerythritol tetrakis(3-hydroxypropionate), pentaerythritol tetrakis(2-mercaptoacetate), or pentaerythritol tetrakis(3-mercaptopropionate) or from any number of partially esterified polyols comprising glycerol monoacetate, neopentylglycol monopropionate, or trimethylolpropane diacetate.

4. The method of claim 2, wherein the pre-polymer or monomer is selected from the group consisting of urea formaldehyde, melamine formaldehyde and other amine formaldehyde prepolymers, polyurethane prepolymers, polyols, isocyanates, and other shell wall forming pre-polymers or monomers.

5. The method of claim 1, wherein forming the hydrophilic phase includes the further step of adding one or more surfactants to a hydrophilic substance.

6. The method of claim 1, including a further step of adding a catalyst to the emulsion.

7. The method of claim 6, wherein the catalyst is an acid.

8. The method of claim 1, including a further step of heating the emulsion.

9. The method of claim 8, including a further step of heating the emulsion to a temperature ranging from 50-70° C. resulting in a reaction time of less than about 3 hours for solid-shell wall formation.

10. A method of forming hydrophobic-core microcapsules comprising:
    forming a first hydrophobic phase including at least one active substance and at least one surfactant in the absence of a cross-linking agent and in the absence of a pre-polymer;
    forming a hydrophilic phase;
    mixing the first hydrophobic phase with the hydrophilic phase to form an emulsion comprising droplets of the first hydrophobic phase dispersed in the hydrophilic phase;
    forming a second hydrophobic phase including a cross-linking agent comprising one or more ester groups and a pre-polymer in the absence of any active substance;

mixing the second hydrophobic phase to said emulsion to form droplets including the first hydrophobic phase and the second hydrophobic phase dispersed in the hydrophilic phase; and initiating a reaction at an interface of the hydrophilic phase and droplets including the first and second hydrophobic phases to form a single shell encapsulating the first and second hydrophobic phases forming hydrophobic-core microcapsules, wherein said single shell includes a shell wall comprising a compound having one or more chemical bonds that are broken down when contacted with an alkali produced during a corrosion reaction causing the release of the first and second hydrophobic phases, wherein said alkali has a pH above about 8.

11. The method of claim 1 wherein said shell wall includes about 20 percent to about 50 percent, by mass, cross-linking agent and about 50 percent to about 80 percent, by mass, pre-polymer.

12. The method of claim 1, wherein said at least one active substance is a corrosion indicator that changes color over the alkaline region of pHs from about 8 to about 10.

13. The method of claim 12, wherein said corrosion indicator is phenolphthalein.

14. The method of claim 1, wherein said at least one active substance is a corrosion indicator that fluoresces in the presence of or upon the oxidation of metal or in the presence or upon the formation of a metal cation complex.

15. The method of claim 14, wherein said corrosion indicator is selected from the group consisting of 7-hydroxycoumarin, coumarin, and Rhodamine B.

16. The method of claim 1, wherein said at least one active substance is a corrosion inhibitor.

17. The method of claim 16, wherein said corrosion inhibitor is selected from the group consisting of sodium nitrate, camphor, polyamine fatty acid salts in a solvent, sodium molybdate, cerium nitrate, sodium phosphate, and calcium metaborate.

18. The method of claim 1, wherein said hydrophobic-core microcapsules have a typical size from about 1 to about 50 microns.

19. The method of claim 10 wherein said emulsion including the first hydrophobic phase and the second hydrophobic phase dispersed in the hydrophilic phase includes:
    about 1 to about 15 percent, by mass, the first hydrophobic phase,
    about 10 to about 20 percent, by mass, the second hydrophobic phase; and
    about 65 to about 89 percent, by mass, the hydrophilic phase.

20. The method of claim 10 wherein said shell wall includes about 20 percent to about 50 percent, by mass, cross-linking agent and about 50 percent to about 80 percent, by mass, pre-polymer.

21. The method of claim 10, wherein said cross-linking agent comprises one or more ester groups.

22. The method of claim 10, wherein said at least one active substance is a corrosion indicator, a corrosion inhibitor, a film-forming compound, or combinations thereof.

23. The method of claim 10, including a further step of adding a catalyst to the emulsion.

* * * * *